Aug. 30, 1927.

N. DE W. NEWTON ET AL 1,641,006

TRACTOR ATTACHMENT

Filed Sept. 18, 1925      3 Sheets-Sheet 1

N. D. Newton
J. A. Newton
INVENTORS

BY Victor J. Evans
ATTORNEY

WITNESS:

Aug. 30, 1927.

N. DE W. NEWTON ET AL 1,641,006

TRACTOR ATTACHMENT

Filed Sept. 18, 1925

N. D. Newton
J. A. Newton
INVENTORS

BY Victor J. Evans
ATTORNEY

WITNESS:

Patented Aug. 30, 1927.

1,641,006

UNITED STATES PATENT OFFICE.

NOEL DE WITT NEWTON AND JAMES A. NEWTON, OF WINCHESTER, ARKANSAS, ASSIGNORS OF ONE-FOURTH TO JOHN PHILIP HARRINGTON, OF WINCHESTER, ARKANSAS, AND ONE-FOURTH TO PINCKNEY S. SEAMANS, OF McGEHEE, ARKANSAS.

TRACTOR ATTACHMENT.

Application filed September 18, 1925. Serial No. 57,160.

One object of our present invention is the provision of an attachment through the medium of which plows, lister disks and the like may be carried behind a tractor, and this in such manner that the ground working elements, plow lister disks or the like, may be expeditiously and easily raised and lowered by the tractor driver with but little effort on his part.

Another object of the invention is the provision of an attachment of the character described embodying simple, efficient and durable means, whereby the plow, lister disks and the like may be adjusted laterally and adjustably fixed so as to promote the efficiency of the plow and lister disks when the tractor is in inclined position.

Other objects and practical advantages of the invention will be fully understood from the following description and claims when the same are read in connection with the drawings, accompanying and forming part of this specification, in which:—

Figure 3 is an enlarged transverse section taken in the plane indicated by the line 3—3 of Figure 2, looking forwardly.

Similar numerals of reference designate corresponding parts in all of the views of the drawings.

Figure 1:
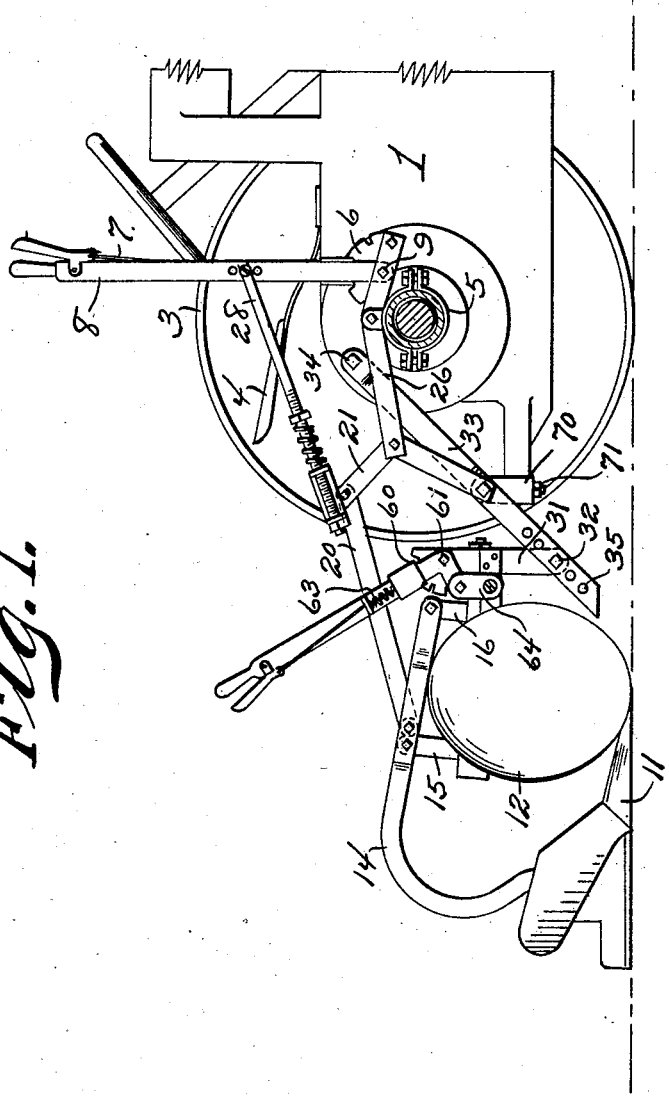
Figure 1 is a view showing the rear portion of a tractor with one of the wheels thereof removed, and with our novel attachment attached to the tractor.

The tractor illustrated may be of the ordinary well known construction or of any other construction to which our improvement is applicable, and it includes a casing body 1 with lateral housings 2 and rear wheels 3. The driver seat of the tractor is mounted on the casing body 1 and is designated by 4.

Fixed on the right hand housing 2 of the tractor is a collar 5, and fixed with respect to the said collar is a segmental rack 6 with which is adapted to cooperate the detent 7 of a hand lever 8 that is fulcrumed at 9, and is designed for the vertical adjustment and adjustable fixing of the body 10 by which a plow 11 and lister disks 12 are carried. The lister disks 12 are connected directly to opposite sides of a rear enlarged portion 13 of the body 10, while the plow 11 is carried by a beam 14 fixedly connected to standards 15 and 16 on the body 10, the said beam having open portion 17, Figure 2, and also having a longitudinal central bar 18. The open portion 17 and central bar 18 are fixed with respect to each other as suggested in Figure 2 of the drawings.

Pivotally connected at 19 to the bar 18 of the beam 14 is a link 20, the said link 20 being connected at its forward end to an arm 21 on a transverse rock shaft 22 disposed in rear of the casing body 1 and above the drawbar 23 usually provided on the said casing body. The said rock shaft 22 is pivotally connected at 24 to a fixed bracket 25 at one side of the casing body 1, and is pivotally connected at its opposite end to a bar 26 fixed to and extending rearwardly from the collar 5. It will also be noted that the rock shaft 22 is provided adjacent to the right hand wheel of the tractor with an arm 27. This arm 27 is connected by a rod 28 with the hand lever 8, and by virtue of the construction described it will be understood that when the hand lever 8 is moved forwardly, the shaft 22 will be rocked, and the body 10 and the plow 11 and lister disks 12 will be swung vertically. This provides for the vertical adjustment of the plow 11 and lister disks 12, and the detent 7 in cooperation with the segmental rack 6 provides for the adjustable fixing of the plow 11 and lister disks 12 against casual vertical movement all of which will be better understood when it is stated that the body 10 is carried by a transverse bar 30 which has depending arms 31 at its ends pivotally connected at 32 to hangers 33 having converging portions connected at 34 to opposite sides of the casing body 1, the said hangers 33 being each provided with a plurality of apertures 35 for the adjustable connection of said arms 31 at points below the horizontal plane of the rear axle of the tractor.

Figure 2:
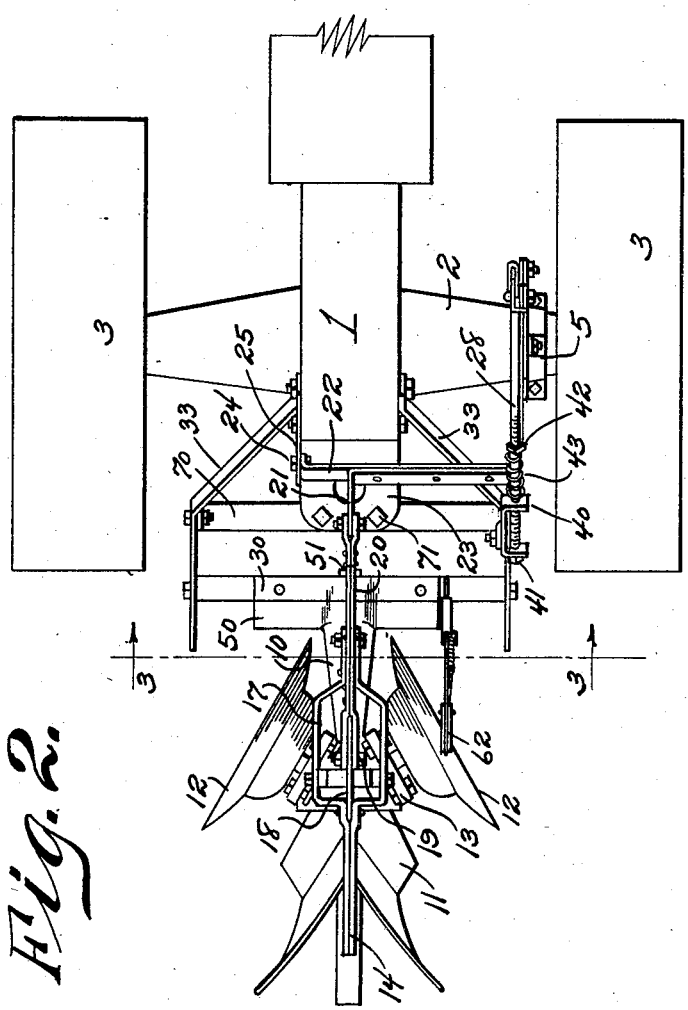
Figure 2 is a top plan view of the same, both rear wheels of the tractor being shown.

As best shown in Figure 2 the rod 28 is extended loosely through a U-shaped bracket 40 on the upper end of the arm 27 and said rod 28 is provided in rear of the bracket 40 with a nut 41, and loosely surrounding the rod and interposed between the forward portion of the bracket 40 and a nut or other abutment 42 on rod 28 is a coil spring 43. By virtue of this construction it will be manifest that the rock shaft 22 and the parts connected therewith are capable of upward movement to a limited extent with respect to the rod 28, such movement being cushioned by the spring 43 and being designed to enable the plow 11 and lister disks 12 to more readily ride over obstructions in their paths.

For the lateral adjustment of the body 10, the plow 11 and the lister disks 12, the body 10 is provided with a forward T-head 50, and the said T-head 50 is pivotally connected by a longitudinal bolt 51 to a block 51' which is secured to the transverse bar 30 so that the body 10 can be rocked laterally on the axis of the said bolt 51. Fixed to one end of the transverse bar 30 is a segmental rack 60, and pivoted at 61 to said rack is a crank lever 62 having a detent 63 for co-operation with the rack 60, the lower arm of the lever 62 being connected by a link 64 with one end of the block 51' from which it follows that by adjusting the lever 62 the body 10 may be rocked laterally on its axis for the purpose indicated, and by co-operation of the detent 63 with the rack 60 the body 10 and plow 11 and lister disks 12 may be adjustably fixed in the laterally inclined positions in which they are placed.

It will be apparent from the foregoing that our novel attachment is readily applicable to tractors, and that it provides for the convenient adjustment of the plow and lister disks both vertically and laterally.

It will also be readily understood that the connection of the body 10 to the bar 30 is a detachable connection so that a body having ground working elements different from the plow 11 and the lister disks 12 may be connected to the bar 30 and to the hand lever 62, and used in lieu of the body 10 and its appurtenances when occasion demands.

It will be apparent from the foregoing that our novel attachment is not only advantageous for the reasons pointed out but is manifestly simple in construction and reliable in operation, and generally well adapted to withstand the usage to which tractor attachments are ordinarily subjected.

In order to lend increased rigidity and strength to the hangers 33, we connect to the said hangers 33 in fixed manner a transverse bar 70 which bar 70 is fixed at 71 to the usual drawbar 72 provided on the tractor body 1.

We have specifically described the preferred embodiment of our invention in order to impart a full, clear and exact understanding of said embodiment. We do not desire, however, to be understood as confining ourselves to the specific construction disclosed, our invention being defined by our appended claims within the scope of which modifications may be made without departure from our invention.

Having described our invention, what we claim and desire to secure by Letters Patent, is:—

1. A plow attachment of the character described comprising a body, ground working means carried by said body, spaced bars having converging portions secured to a tractor body, a transverse bar pivotally secured to the spaced bars and adapted for vertical adjustment thereon, a block fixed to the transverse bar, means securing said body to the block for a lateral rocking movement, and means for adjusting said body in vertical planes at right angles to each other.

2. A tractor attachment of the character described comprising spaced bars having converging portions secured to the body of the tractor, a transverse bar secured to the spaced bars and being capable of vertical adjustment thereon, a block secured to and resting upon said transverse bar, a body carrying ground working means, a longitudinally disposed pivot connecting said body with said block in a manner whereby said body is capable of a lateral rocking movement, a transverse rock shaft having one portion secured to the tractor body, an arm extending from the rock shaft and connected with the ground working means, a second arm extending from the rock shaft, means secured to the second arm for rocking said rock shaft whereby the ground working means may be moved in a vertical plane, and means in connection with the last mentioned means for retaining said ground working means in adjusted position in said plane.

3. A tractor attachment of the character described comprising a pair of spaced bars secured to the tractor body, a transverse bar bridging the spaced bars and being pivotally secured thereto and capable of vertical adjustment thereon, a block fixed to the transverse bar centrally thereof, a body having a longitudinal bolt extending therefrom and swiveled in and secured to said block whereby said block is capable of a lateral rocking movement, ground working means having connection with said body for movement therewith, a transverse rock shaft having one end pivotally secured to the tractor body, an arm extending from the opposite end, means connected with said arm for rocking the transverse rock shaft, a second arm formed with said transverse rock shaft, means secured to the second arm and the ground working means respectively for imparting movement thereto in a vertical plane, means in connection with the first mentioned means for retaining said ground working means in adjusted positions in its vertical plane, and means including a handle and having connection with the block and body respectively for rocking the body laterally and retaining the latter and the ground working means respectively in a horizontal plane and its laterally adjusted positions.

4. A tractor attachment of the character described comprising spaced bars having converging portions secured upon opposite sides of the tractor body, a transverse bar having its ends pivotally secured to the spaced bars and being vertically adjustable thereon, a block fixed to the transverse bar, a body movably secured to the block and carrying ground working means, a transverse rock shaft, means formed with said rock shaft for pivotally securing the shaft to the tractor body, an arm formed with said shaft, a U-shaped bracket pivotally secured to said arm, a rod mounted for movement in the arms of the U-shaped bracket, means pivotally connecting the ground working means to the shaft, means secured to the rod for adjusting the ground working means through the instrumentality of the rock shaft and first mentioned means respectively, said second mentioned means including means for retaining the ground working means in its adjusted positions and a collar secured to said tractor for connecting the second mentioned means thereto.

In testimony whereof we affix our signatures.

NOEL DE WITT NEWTON.
JAMES A. NEWTON.